United States Patent [19]

Craine

[11] Patent Number: 5,321,241

[45] Date of Patent: Jun. 14, 1994

[54] SYSTEM AND METHOD FOR TRACKING CASINO PROMOTIONAL FUNDS AND APPARATUS FOR USE THEREWITH

[75] Inventor: Philip L. Craine, Saratoga, Calif.

[73] Assignee: Calculus Microsystems Corporation, Santa Clara, Calif.

[21] Appl. No.: 34,205

[22] Filed: Mar. 19, 1993

Related U.S. Application Data

[63] Continuation-in-part of Ser. No. 860,408, Mar. 30, 1992, abandoned.

[51] Int. Cl.[5] .............................................. G06F 15/28
[52] U.S. Cl. ..................................... 235/380; 902/23; 364/412; 273/138 A
[58] Field of Search ................... 364/412; 273/138 A; 235/380; 902/23

[56] References Cited

U.S. PATENT DOCUMENTS

| 4,001,550 | 1/1977 | Schatz | 235/379 |
|---|---|---|---|
| 4,322,612 | 3/1982 | Lange | 235/419 |
| 4,575,622 | 3/1986 | Pellegrini | 235/382 |
| 4,614,861 | 9/1986 | Pavlov et al. | 235/380 |
| 4,630,201 | 12/1986 | White | 235/380 |
| 4,634,845 | 1/1987 | Hale et al. | 235/380 |
| 4,669,730 | 6/1987 | Small | 273/138 |
| 4,736,094 | 4/1988 | Yoshida | 235/379 |
| 4,875,164 | 10/1989 | Monfort | 364/412 |
| 4,877,947 | 10/1989 | Mori | 235/381 |
| 4,900,903 | 2/1990 | Wright et al. | 235/380 |
| 5,038,022 | 8/1991 | Lucero | 235/380 |
| 5,135,224 | 8/1992 | Yamamoto et al. | 273/138 A |
| 5,179,517 | 1/1993 | Sarbin et al. | 364/410 |

Primary Examiner—John Shepperd
Attorney, Agent, or Firm—Flehr, Hohbach, Test, Albritton & Herbert

[57] ABSTRACT

A system for tracking casino promotional funds given to a casino patron, comprising a plurality of gaming machines A bank controller is provided for the plurality of gaming machines. A server is connected to the bank controller. A plurality of memory devices are provided. Each memory device has a memory which has encoded therein an identification of a serial number which is assigned to a casino patron receiving the memory device. The system provides an account balance for the casino patron which is associated with the memory device supplied to the casino patron. An interface device is provided on each gaming machine and is adapted to interface with the memory device to permit operation of the gaming machine and to permit debiting of the account balance of the casino patron as the gaming machine is operated by the casino patron utilizing the assigned memory device.

22 Claims, 6 Drawing Sheets

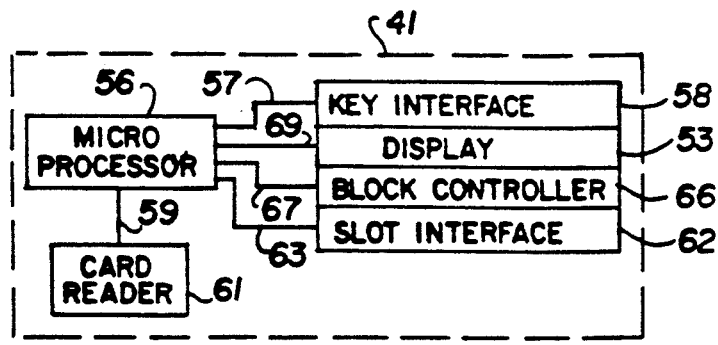
Fig.4
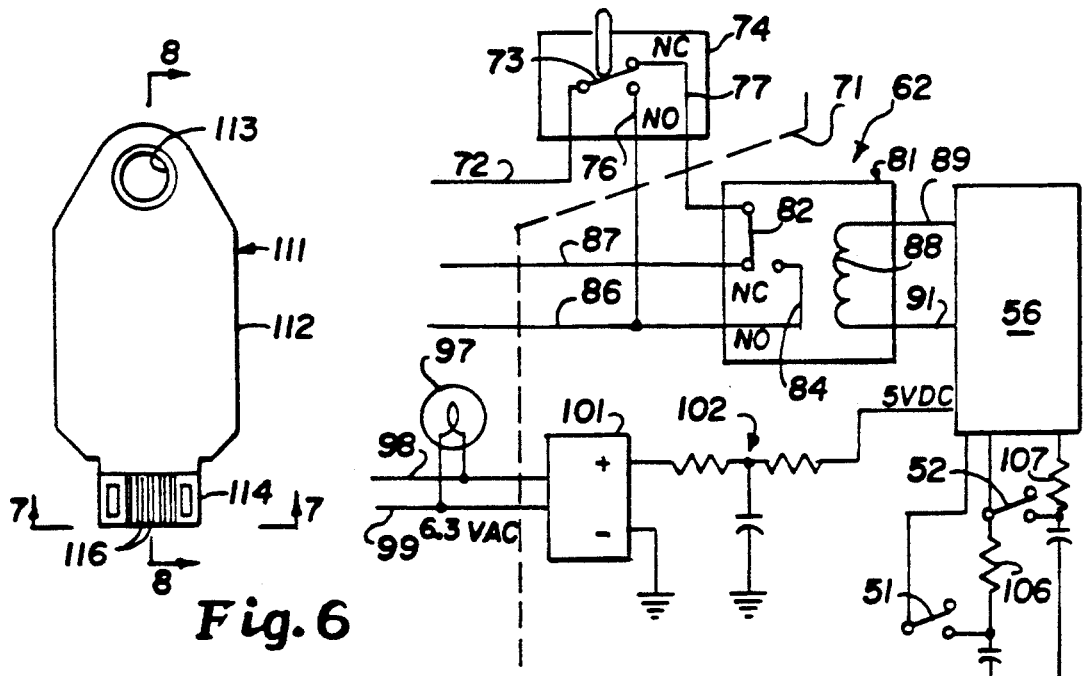
Fig.5
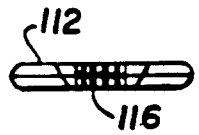
Fig.6
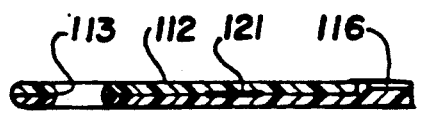
Fig.7
Fig.8
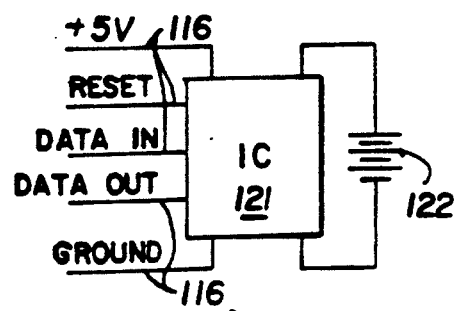
Fig.9

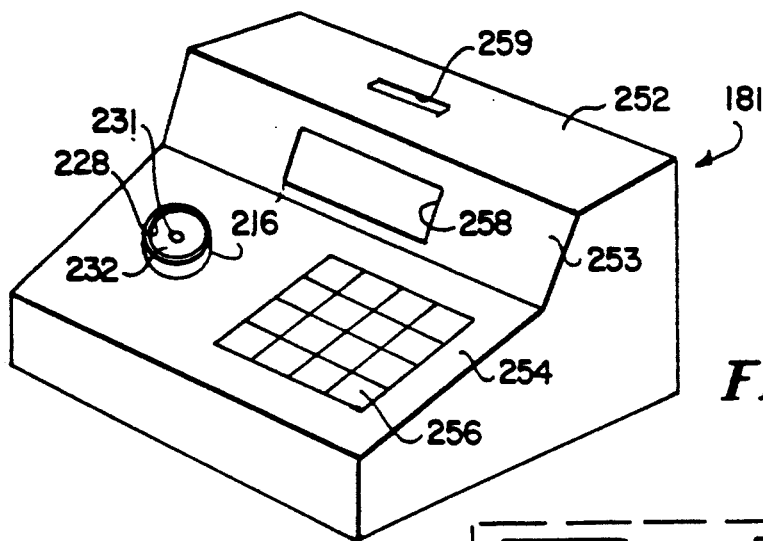
*FIG. 17*
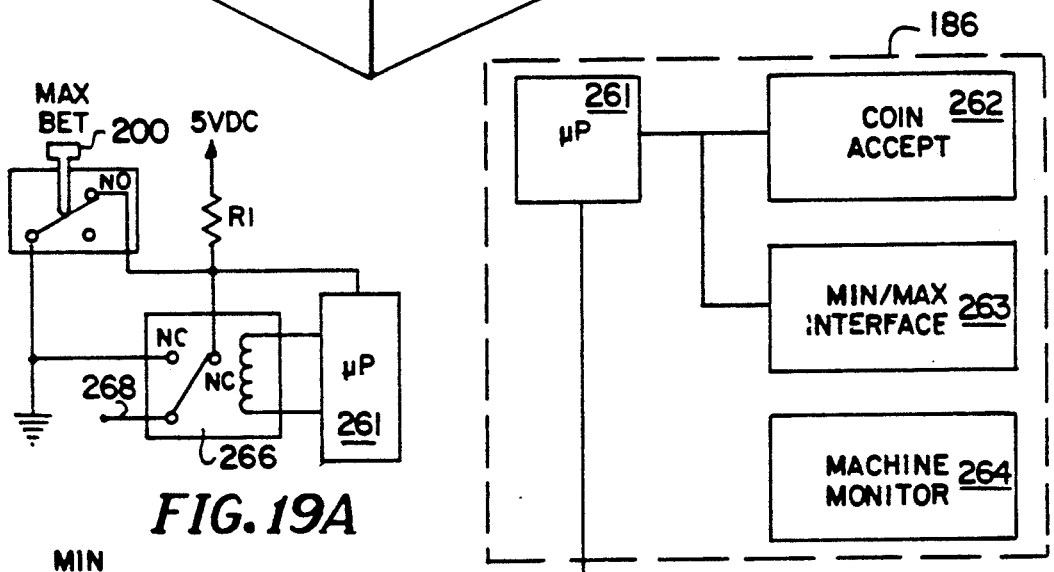
*FIG. 19A*
*FIG. 18*
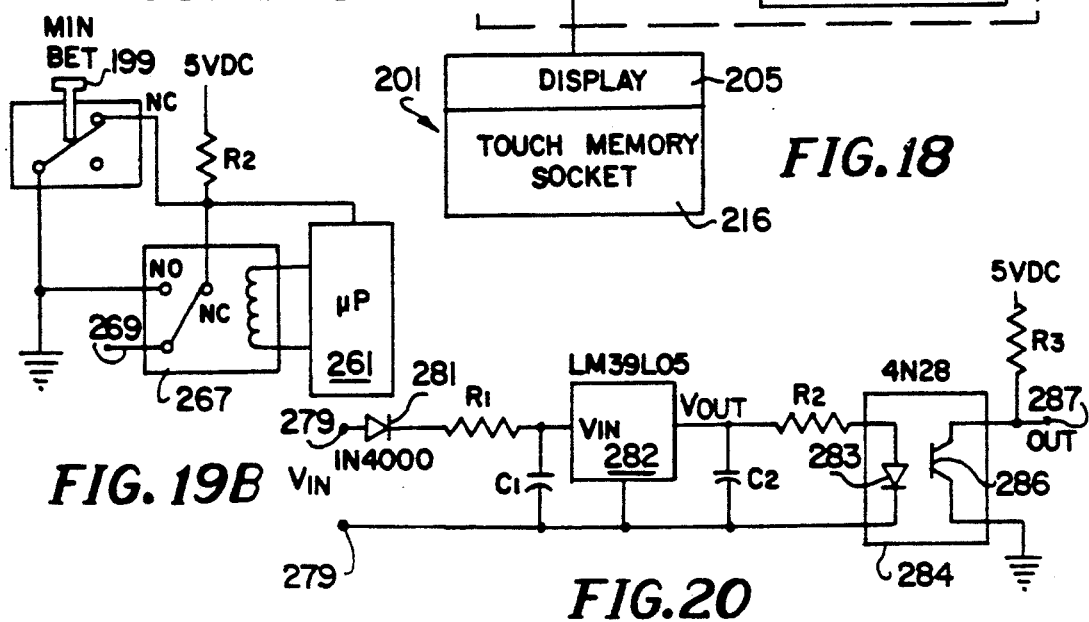
*FIG. 19B*
*FIG. 20*

SYSTEM AND METHOD FOR TRACKING CASINO PROMOTIONAL FUNDS AND APPARATUS FOR USE THEREWITH

This application is a continuation-in-part of application Ser. No. 07/860,408 filed on Mar. 30, 1992, now abandoned.

This invention relates to a system and method for tracking casino promotional funds and apparatus for use therewith.

In casino operations it is typical to provide promotional travel packages to the casino. Typically those promotional packages provide transportation to the casino in return for a monetary compensation from the passengers. When those passengers arrive at the casino they have part of their expenses of their transportation reimbursed to them in the form of coupon books which can be torn out by them as casino patrons and cashed in for currency. When the coupons are turned in for such currency, the casino at the present time has no way to track what happens to that currency once the currency is acquired by the casino patron. For example the casino patron could take it home, spend it on food or spend it even in another casino. This often defeats the purpose of the promotional package put out by the casino because it is the intent of the casino to have the casino patron spend the currency attained from the coupon book on gambling in that casino. There is therefore a need for a system, apparatus and method which will make it possible for a casino to track its promotional funds which it gives to the casino patrons arriving on promotional package tours.

In general, it is an object of the present invention to provide a system, apparatus and method for tracking casino promotional funds.

Another object of the invention is to provide such a system, apparatus and method which ensures that the promotional funds are expended in the casino issuing the promotional funds.

Another object of the invention is to provide a system, apparatus and method of the above character which is particularly suitable for interfacing with slot machines in the casino.

Another object of the invention is to provide a system, apparatus and method of the above character in which a key or card is issued to the casino patron which has a monetary value embedded in the key or card which can be utilized to play slot machines in the casino.

Another object of the invention is to provide a system, apparatus and method of the above character in which the key or card is encoded so that it only can be utilized in the casino issuing the key or card.

Another object of the invention is to provide a system, apparatus and method of the above character in which the casino can initialize and program the keys or cards to place a desired monetary value on the key or card.

Another object of the invention is to provide a system, apparatus and method of the above character which can be utilized on existing slot machines as well as on new slot machines.

Another object of the invention is to provide a system and apparatus of the above character in which minimum and maximum bet functions can be provided.

Another object of the invention is to provide a system, apparatus and method of the above character in which a touch-memory device is issued to the casino patron rather than a key.

Another object of the invention is to provide a system, apparatus and method of the above character in which the touch-memory device is provided with a unique serial number and is reusable.

Another object of the invention is to provide a system, apparatus and method of the above character in which the serial number of the touch-memory device is assigned to a casino patron.

Another object of the invention is to provide a system, apparatus and method of the above character in which the touch-memory device is provided with a security byte.

Another object of the invention is to provide a system, apparatus and method of the above character in which the casino can deactivate the assignment of a serial number of a touch-memory device to a casino patron.

Another object of the invention is to provide a system, apparatus and method of the above character in which the account balance of a casino patron is maintained in the system remote from the touch-memory device.

Another object of the invention is to provide a system, apparatus and method of the above character in which the touch-memory device can be utilized by a casino patron to debit his account balance.

Another object of the invention is to provide a system, apparatus and method of the above character in which winnings by the casino patron can be automatically posted to his account balance.

Another object of the invention is to provide a system, apparatus and method of the above character in which a digital display is provided notifying the casino patron of the associated account balance and changes in that account balance.

Another object of the invention is to provide a system, apparatus and method of the above character which utilizes a minimum of data to facilitate high speed interaction in the system.

Another object of the invention is to provide a system, apparatus and method of the above character in which a socket is provided for receiving the touch-memory device and which provides minimum of two electrical interface contacts to interact with the touch-memory device.

Another object of the invention is to provide a system, apparatus and method of the above character in which the casino patron's account can be debited when the touch-memory device is placed in the socket.

Another object of the invention is to provide a system, apparatus and method of the above character in which the gaming machine can be operated by the casino patron after insertion of the touch-memory device by operation of the MIN and MAX push buttons.

Another object of the invention is to provide a system, apparatus and method of the above character in which the touch-memory device is carried by a handle to permit the touch-memory device to be readily carried by the hand.

Additional objects and features of the invention will appear from the following description in which the preferred embodiments are set forth in conjunction with the accompanying drawings.

FIG. 4 is a block diagram showing the apparatus incorporated in a controller device of the type shown in FIG. 3.

FIG. 5 is a schematic diagram showing the interaction between the mechanical and electrical portions of an existing slot machine and the manner in which it interfaces with the controller device shown in FIGS. 3 and 4.

FIG. 6 is an outline drawing of a key utilized in the present invention.

FIG. 7 is a view of the key shown in FIG. 6 looking along the line 7—7 of FIG. 6.

FIG. 8 is a cross sectional view taken along the line 8—8 of FIG. 6.

FIG. 9 is a block diagram showing the circuitry which is incorporated in the key shown in FIG. 6.

FIG. 17 is an isometric view of a cashier's terminal incorporating the present invention for use in the system shown in FIG. 12.

FIG. 18 is a block diagram of the internal controller device and the external touch-memory interface device utilized in the gaming machine shown in FIG. 13.

FIGS. 19A and 18B are interface circuit diagrams for the MIN and MAX push buttons for use on the gaming machines incorporating the present invention shown in FIGS. 13 and 15.

FIG. 20 is an interface circuit diagram for use on the gaming machines shown in FIGS. 13 and 15 permitting use of various supply voltages.

In general the system for tracking casino promotional funds given to casino patrons is comprised of a plurality of gaming machines in a casino A bank controller is provided for the plurality of gaming machines. A server is coupled to the bank controller for receiving information from and transmitting information to the bank controller. A plurality of memory devices is provided with each memory device having encoded a serial number which can be assigned to the casino patron. An account balance remote from the memory device is placed in the system for each casino patron. An interface device is provided with each gaming machine and is adapted to receive a memory device to permit operation of the gaming machine and to supply information to the bank controller as the account balance is debited thereby making it possible for the casino to track the promotional funds issued by the casino and to ensure that the promotional funds are only expended in that casino.

Figure 1:
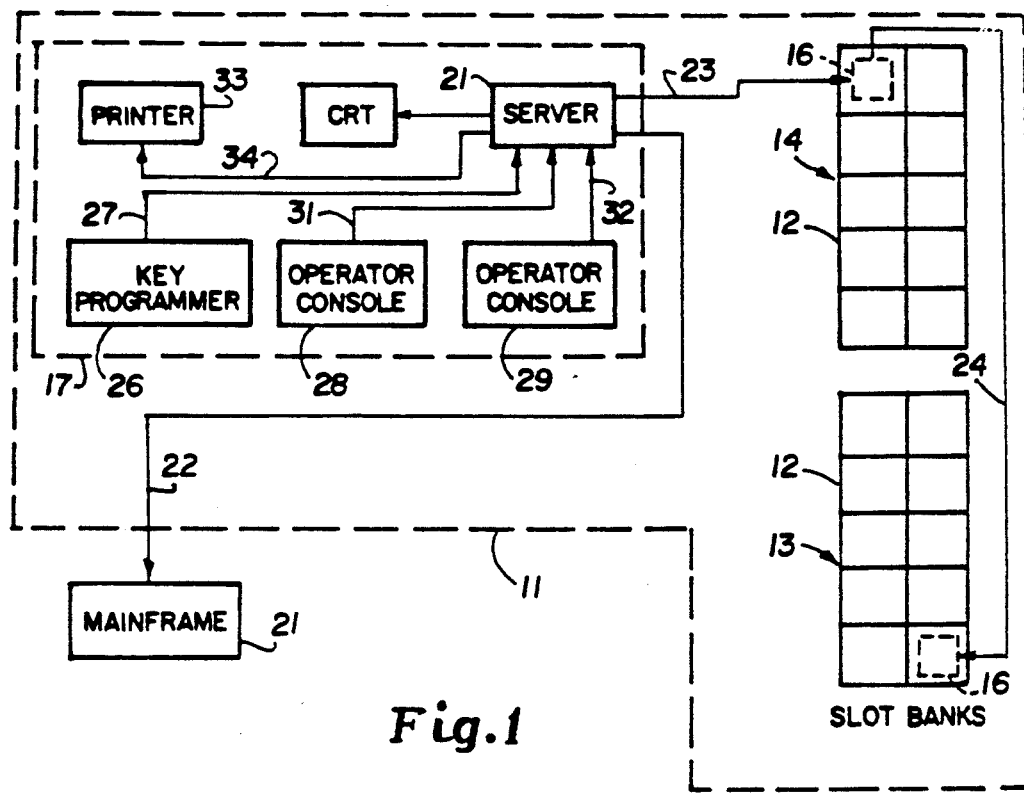
FIG. 1 is a floor plan of a casino having a plurality of slot machines therein which are connected to the system and apparatus of the present invention.

More in particular, the system for tracking casino promotional funds given to casino patrons is shown in FIG. 1. FIG. 1 shows a floor plan of a casino gaming floor which typically includes a number of different gaming games which may include many slot machines of different kinds that are capable of receiving tokens and coins of various values. A few of such slot machines 12 are shown in FIG. 1 and are arranged in two banks 13 and 14 with two rows of five each, with the slot machines positioned back to back. Each bank of slot machines is provided with a bank controller 16 mounted in one of the slot machines.

Typically, the casino is provided with an office 17 which has housed therein various components of the present system. The office is provided with computer means in the form of a server 19 of a conventional type which can be connected to a mainframe computer 21 located elsewhere in the casino and connected to the mainframe computer by a cable 22. The server 19 is also connected by cables 23 and 24 to the bank controllers 16 in the banks 13 and 14. A key or card programmer 26 is provided within the office 17 and is connected to the server by cable 27. As hereinafter explained, this key or card programmer 26 makes it possible for casino personnel to initialize and make ready keys and/or cards for issuance to casino patrons. Operator consoles 28 and 29 of a conventional type having keyboards are connected by cables 31 and 32 to the server 19. A printer 33 is provided which is connected by cable 34 to the server 19 and is utilized for printing out reports based on the activity of the system throughout the slot machine floor. All of the components hereinbefore listed for use in the office 17 with the exception of the key or card programmer 26 are off the shelf items.

Figure 2:
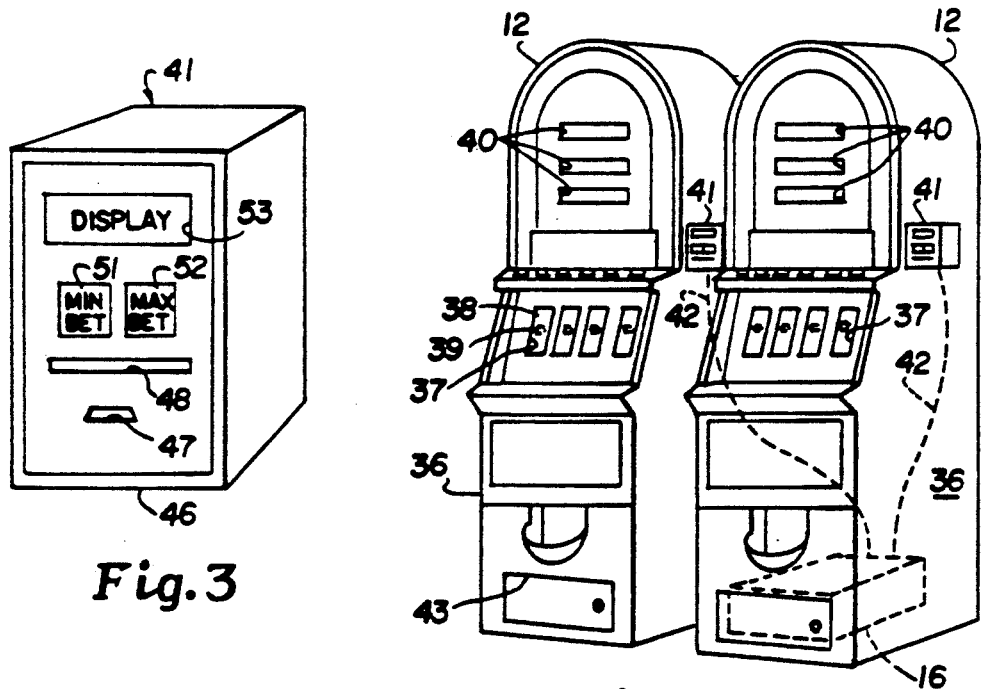
FIG. 2 is a perspective view of a pair of slot machines mounted side-by-side and having a controller device mounted thereon incorporating the present invention.

Two of the slot machines 12 shown in FIG. 1 are shown side-by-side in FIG. 2. The slot machines 12 are representative slot machines provided with a cabinet 36 having a window 37 therein and displaying the peripheral margins of rotatable wheels 38 typically provided in such slot machines and having indicia 39 thereon. A plurality of visual displays 40 are provided in the upper part of the cabinet 36.

A controller box or device 41 is provided for each slot machine and can be mounted in a suitable position as for example on a side of the cabinet 36. Alternatively, it can be embedded within the slot machine itself. Each controller box or device 41 is connected by a cable 42 to the bank controller 16 provided behind the locked cabinet door 43 of one of the cabinets 36 of a slot machine 12 in the bank of slot machines.

Figure 3:
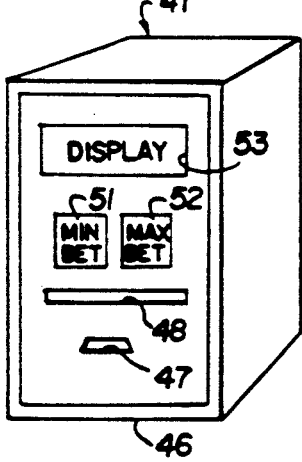
FIG. 3 is an isometric view of one of the controller devices mounted on the slot machine shown in FIG. 2.

As shown in FIG. 3, each controller box or device 4 consists of a small box-like case 46 which is provided with a key socket 47 in its lower extremity with a card slot 48 positioned thereabove. The case 46 also carries minimum and maximum bet buttons 51 and 52, which are adapted to be activated by the user as hereinafter described to decide whether a single coin drop is to be simulated from the debited card or key or whether the machine maximum coin drops are going to be activated and debited from the card or key.

A visual display 53 is provided in the front wall of the box-like cabinet 41. For example the digital display can provide two lines of sixteen characters each. This display can be utilized to provide a welcoming message to the casino patron before the card or key is inserted. Also it can be utilized to display messages as to whether the card or key is valid. If bets are being placed utilizing the minimum bet or maximum bet buttons 51 and 52 the display can give feedback to the casino patron as to whether or not the slot machine can handle additional credits and whether the next step is for the casino patron to pull the handle (not shown) or to push an operate button (also not shown).

The controller box or device 41 has mounted in the cabinet 46 the circuitry which is shown in FIG. 4. It consists of a conventional microprocessor 56. The microprocessor 56 is connected by a five-lead cable 57 to a key interface 58 to receive keys in the key socket 47 as hereinafter described. It is also connected by cable 59 to a card reader 61 which is adapted to read magnetically inscribed cards which are positioned in the card slot 48. The microprocessor is also connected to a slot machine interface 62 by a cable 63. It is also connected to a 286 interface block by an RS-232 communication link 67. It is also connected to the display 53 by a 17-lead cable 69. The 286 interface block 66 is connected to the bank controller 16 by the cable 42. As hereinafter explained, the slot interface 62 actually serves to credit the coins to the slot machine and monitors whether the slot machine is capable of accepting any more coins.

The details of the slot machine interface 62 are shown in FIG. 5. The portions of the circuitry existing in the existing slot machine are as shown on the left-hand side of the artificial dividing line 71 whereas the new components of the electrical of the circuitry are shown on the right-hand side of the line 71. Thus in the existing slot machine there is provided a wire 72 which is connected to the common contact 73 of a mechanical activating device in the form of a coin-operated relay 74 which is provided with a normally open contact 76 and a normally closed contact 77. The mechanically activated device 74 is connected to an electrically activated device in the form of a relay 81 which is provided with a movable common contact 82 which is connected to the normally closed contact 77 of the mechanically activated device 74. It is also provided with a normally open contact 83 which is connected to the normally open contact 76 of the mechanically activated device 74. It is also provided with a normally closed contact 84 which is connected to an existing wire 86. The normally open contact 83 is also connected to an existing wire 87. The relay 81 is provided with an operating coil 88 which is connected by conductors 89 and 91 to a microprocessor 56 which for example can be the DS 5000 supplied by Dallas Semiconductor.

The existing circuitry in the slot machine also includes a lamp 97 which lights an "insert coin" sign. The lamp 97 is supplied with power by conductors 98 and 99 from the existing slot machine. The wires 98 and 99 are also connected to a bridge rectifier 101 which converts the 6.3 volts AC supplied to the lamp 97 to a DC signal which is filtered by a resistive-capacitive network 102 and is supplied as 5 volts DC to a microprocessor 56. The filtering network 102 serves to remove noise spikes from the DC signal supplied by the bridge rectifier 101. The minimum and maximum buttons 51 and 52 are connected into the microprocessor 56 by circuitry which includes resistive-capacitive networks 106 and 107 respectively that serve as denouncing networks to prevent false signals from being sent to the microprocessor 56 in the event mechanical switch chatter occurs.

From the foregoing description of FIG. 5 it can be seen that relatively simple connections can be made to the existing slot machines tend to incorporate the present invention therein. The control box device 41 utilizes a plurality of parallel connections to the mechanical activating device permitting normal operation of the slot machine and at the same time permitting operation of the slot machine through the use of the controller box 41. As hereinafter explained, the controller box or device 41 makes the slot machine believe that the mechanical activating device has been operated when in fact it is the electrically activated device 81 which had been operated to override the mechanical activating device. This caused the slot machine to believe that a physical coin has been dropped into the machine when in fact only a debit has been removed from the key or card as hereinafter described. All of the original functions of the slot machine are maintained. More particularly, the normally closed wire connected to the mechanically activated device 74 is opened and inserted therebetween are the normally closed contacts 48 of the relay 81. By accomplishing the wiring hereinbefore described it makes it possible by energization of the coil 88 of the relay 81 to have the slot machine believe that the normally closed contacts of the mechanically activated device 74 have been operated to open the contacts (see FIG. 5). In this way, signals are supplied to the slot machine in the same manner as when the mechanically activated device 74 is actuated.

In addition to performing the functions hereinbefore described, the relay 81 also serves to isolate the electrical circuitry of the existing slot machine from the microprocessor 56.

One of the plurality of memory devices in the form of keys 111 to be utilized in the present invention is shown in FIGS. 6–8. The key 111 is of a conventional type such as that supplied by Dallas Semiconductor under part number DS 6204. It is provided with a split housing 112 and is provided with a hole 113. The housing 112 is provided with a protruding portion 114 which carries recessed contact members 116 therein which are adapted to interface with the key interface 58 provided in the controller device 41.

The key 111 is provided with electronic circuitry within the housing 112 which is shown in block form in FIG. 9. As shown therein it consists of an integrated circuit 121 which has suitable power supplied thereto by a battery 122. The five contacts 116 which are provided on the protruding portion 114 of the housing 112 perform the functions which are shown in FIG. 8, namely, from top to bottom +5 volts reset $D_{in}$, $D_{out}$ and ground. These five wiper contacts 116 communicate with the outside world and in particular the microprocessor 56 provided in the controller box or device 41. The $D_{in}$ and $D_{out}$ refer to data in and data out. The internal battery 122 is provided to retain the data in the integrated circuit microprocessor 122.

The microprocessor 121 in each key is programmed so that it has its own serial number so that each specific key can be identified on the casino floor where it is being used. The microprocessor will also have a code which represents casino identification and permits the system of the present invention to differentiate one casino's keys from another casino's keys. The microprocessor 121 also contains a customer or casino patron identification so that the casino patron can be associated with a specific key. It also has the capability of being encoded with a specific amount of money which can be varied in accordance with the desires of the casino issuing the key.

Other controls can also be readily incorporated into the microprocessor of the key. A casino can have the discretion to program the key to vary the amount of money that can be debited against the key per hour, as for example $2.00 per hour for gambling on the casino slot machines. At the desire of the casino the key can be provided with the capability of giving unlimited time for the casino patron to expend the funds credited on the key. The key can also be provided with an expiration date at the desire of the casino which means that after a certain predetermined time, the key will no longer be accepted in the system.

The microprocessor 121 used in the key in the present invention is a fixed function processor which makes it possible to receive a 64-bit password from the microprocessor 56 provided in the controller box or device 41. The key after it receives this password determines whether or not it has been programmed with that password and if it is incorrect, the key cannot be used. This is a security feature and prevents the use of counterfeit keys.

In order to have the keys returned to the casino after all of the funds credited thereon have been debited, the casino can provide one slot machine which has been modified to accept the key as a physical token rather than a coin. The key when it is received from the slot machine can be dropped into a receptacle (not shown) provided in the cabinet of the machine. This will permit a casino patron to have his one last chance to win a jackpot at a specific slot machine.

Figure 10:
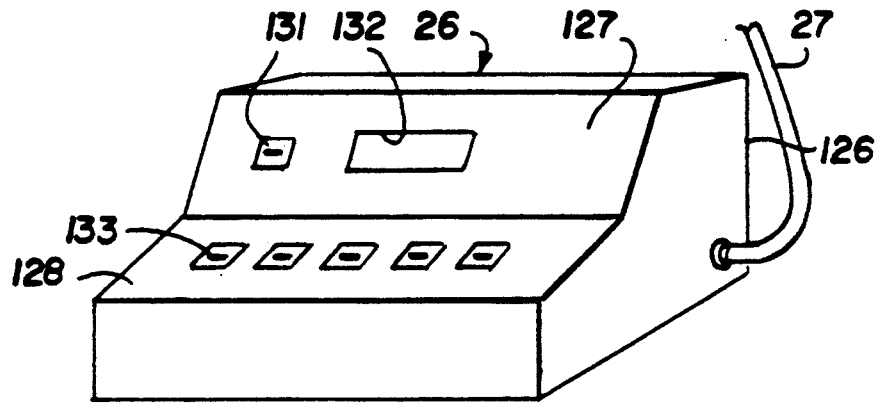
FIG. 10 is an isometric view of a key programmer utilized in the system and method of the present invention.
Figure 11:
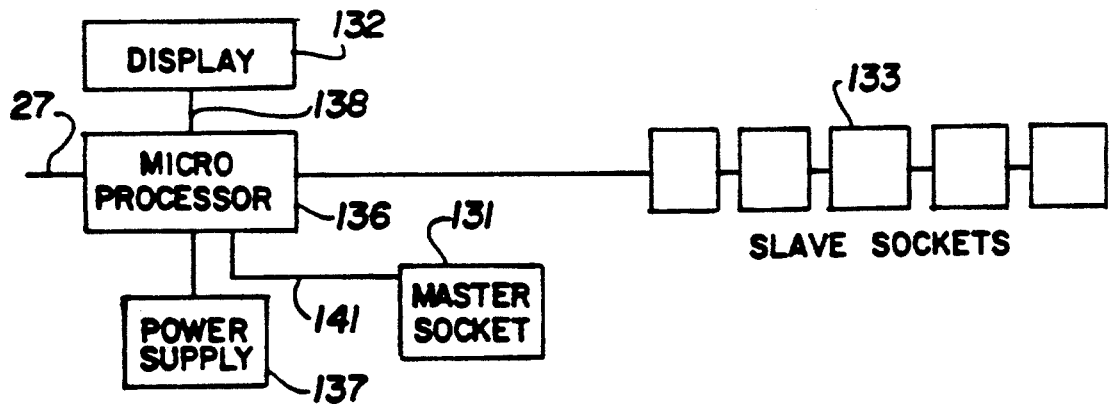
FIG. 11 is a block diagram showing the circuitry which is incorporated in the key programmer shown in FIG. 8.

Hopefully this will encourage the casino patrons to drop the zero credit balance keys into that slot machine. A key programmer 26 for use in the system of the present invention is shown in FIG. 10 and consists of a cabinet 126 which is provided with a generally vertical front panel 127 and an inclined front panel 128. The front panel 127 is provided with a master key slot 131 and a visual display 132. The visual display 132 can be of a conventional type as for example two lines by sixteen characters per line. The inclined front panel 128 is provided with a plurality of slave key sockets 133. The circuitry for the key programmer 26 as shown in FIG. 11 consists of a microprocessor 136 which is connected to a power supply 137. The microprocessor 136 is connected by a cable 138 to the display 132. The master socket 131 is connected to the microprocessor by a cable 141 and the slave sockets 133 are connected to the microprocessor 136 by a cable 142. The microprocessor 136 is connected by the serial communication link 27 to the server 21 as hereinbefore described.

In utilizing the key programmer 26, it is necessary to provide a master key which is programmed utilizing the key programmer 26 to place the appropriate information into the key. Such a master key is tightly controlled and typically would only be retained by the system administrator. Other types of master keys can be provided to the system administrator in a similar manner with each master key being provided for each different type promotion.

Assuming that a master key has been produced, additional keys can be produced from this master for delivery to casino patrons by inserting keys to be programmed in the slave sockets 133 and placing the master key 131 in the master key socket. A display will appear on the display 132 which can be viewed by the casino program using one of the office consoles 28 and 29. The programmer then notifies the system that he wishes to program some keys with a block of serial numbers which are inserted into the slave keys with the appropriate validation dates. The slave keys are then automatically programmed with the information from the master key. The slave keys after they have been programmed can be removed and another set of keys can be inserted into the slave sockets 133 until the appropriate number of keys have been produced for that particular promotional program. The program keys can then be delivered to casino personnel who in turn can deliver program keys by serial numbers to specific casino patrons arriving on a packaged tour.

In connection with the foregoing it should be appreciated that cards can be utilized in place of keys if desired and can be magnetically or optically programmed in a similar manner to provide a currency value in the card which can be utilized in connection with the controller box or device 41 in the same manner as the keys.

The casino patron after receiving the card or key from the casino can then utilize the key or card to operate slot machines in the casino merely by inserting the key into the key slot 49 or the card into the card slot 48 of the controller box or device 41. Thereafter the casino patron can then utilize the slot machine in a conventional manner by utilizing the currency credited on the key or card by having the same debited as the slot machine is operated. The casino patron can also utilize the "MIN" and "MAX" buttons 51 and 52 in a conventional manner to also debit the appropriate number of bets onto the casino patron's key. Within the control set by the casino, the casino patron can then use the credit amount on the key or card to operate the slot machines and to attempt to achieve winnings from those slot machines. This activity can be continued on one or more slot machines of the casino until all of the credit given to the casino patron has been utilized in the slot machines. Exhaustion of credit will be indicated on the display 53 of the controller device. When a zero balance is reached, the key can be returned to the casino or alternatively as hereinbefore explained the casino can provide a slot machine which has been specially modified to accept the keys to give the casino patron one more opportunity to make a winning from the slot machine.

All of the activities of the casino patron utilizing the key are recorded in the bank controller 16 which supplies the information to the server 19. This information can be accumulated in the server and/or in the mainframe computer 21 provided in the computer and at periodic times the information can be printed out on the printer 33 in an appropriate format.

Figure 12:
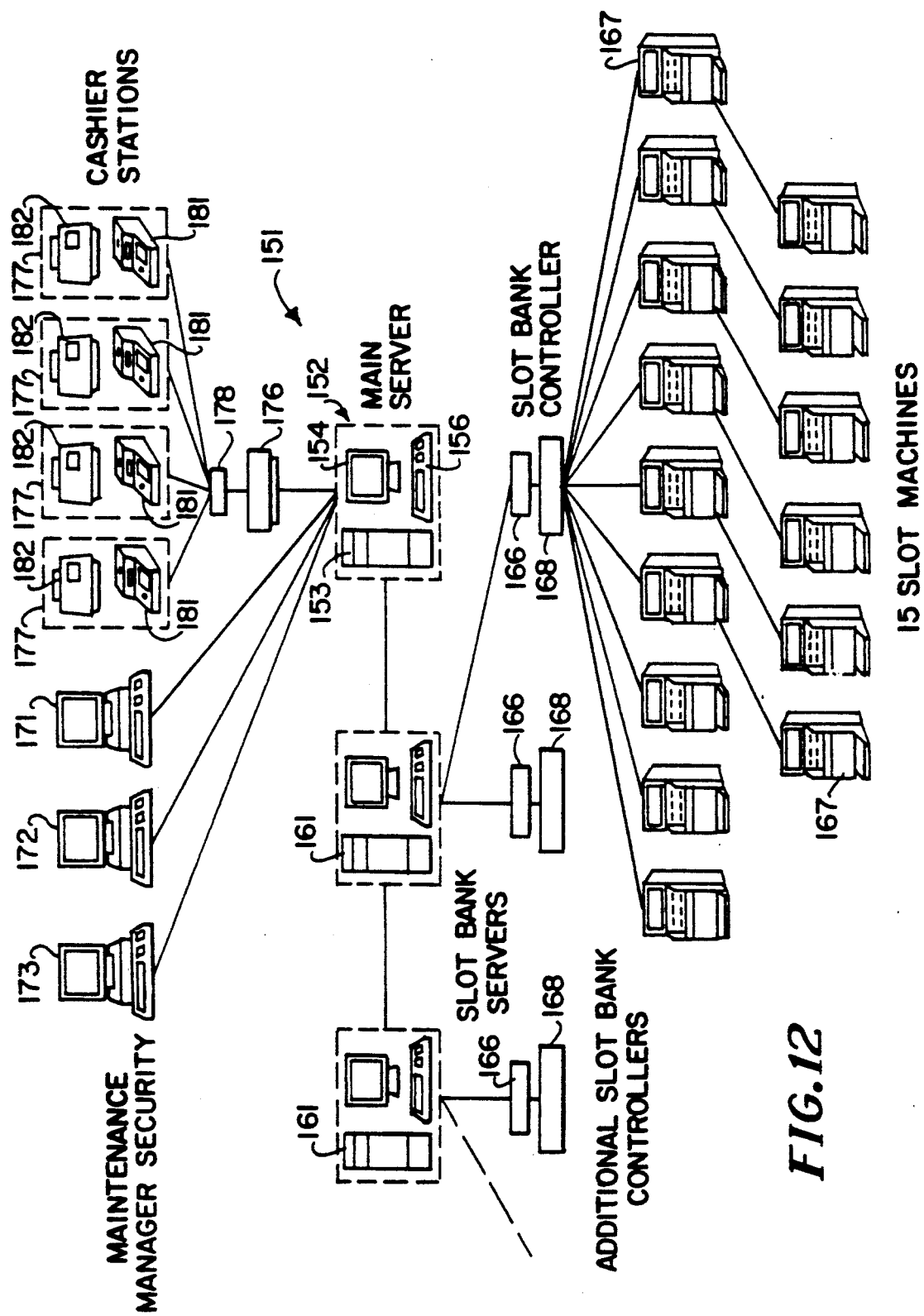
FIG. 12 is a schematic diagram showing another embodiment of a system incorporating the present invention and showing the system interconnections.

Another embodiment of a system 151 and method for tracking casino promotional funds and apparatus for use therewith is shown in FIG. 12. The system 151 as shown therein is comprised of a main server 152 which can be of a suitable type, as for example an IBM 486 PC which consists of a control console 153, a video monitor 154 and a keyboard 156. The main server 152 keeps track of the historical data of activity on the casino floor. It also keeps track of inactive keys that are not currently being utilized on the casino floor. Typically one main server 152 can be provided for each casino. The main server 152 is connected to one or more and generally a plurality of slot bank servers 16 which also can be in the form of an IBM 486 PC. The slot bank servers 161 collect real time data off of the casino floor and handles the memory devices that are active on the casino floor. Each slot bank server 161 is capable of servicing as many as 20 slot bank controllers 166 which can be in the form of IBM 386 PCs. Each slot bank controller 166 is connected to as many as 15 gaming machines, as for example slot machines 167 through an interface unit 168. Thus, each slot bank server is capable of controlling as many as 300 slot machines.

It should be appreciated that for large casinos, additional slot bank servers can be provided to service additional gaming machines. Thus, each slot machine is connected through the slot bank controller 166 to a slot bank server 161 which is connected to the main server 153 As shown in FIG. 12, the main server 152 is connected to a plurality of additional stations, as for example security, manager and maintenance stations 171, 172, and 173, each of which can be in the form of an IBM 386 PC. In this way, the manager can continuously monitor activities in the casino. Similarly, security and maintenance functions can be continuously monitored at the casino.

The main server 152 is also connected to a cashier station controller 176 which also can be in the form of an IBM 386 PC. The cashier station controller 176 is connected to a plurality of cashier stations 177 through an interface unit 178. The interfaces 168 and 178 concentrates the data down into a single data stream that can be handled easily by the slot bank controller through a single access port. Each cashier station 177 can be located in a cashier's cage in a casino. Each cashier's station is provided with a cashier terminal 181 of the type hereinbefore described which permits a cashier to increase or decrease the value on a memory device, assign new memory devices and associate casino patrons with the serial numbers of specific keys. Also provided at each cashier's station is a printer 182 of a conventional type such as one manufactured by Star Corporation which prints 20 columns on calculator-type tape this makes it possible for the cashier to deliver a paper receipt to the casino patron.

Figure 13:
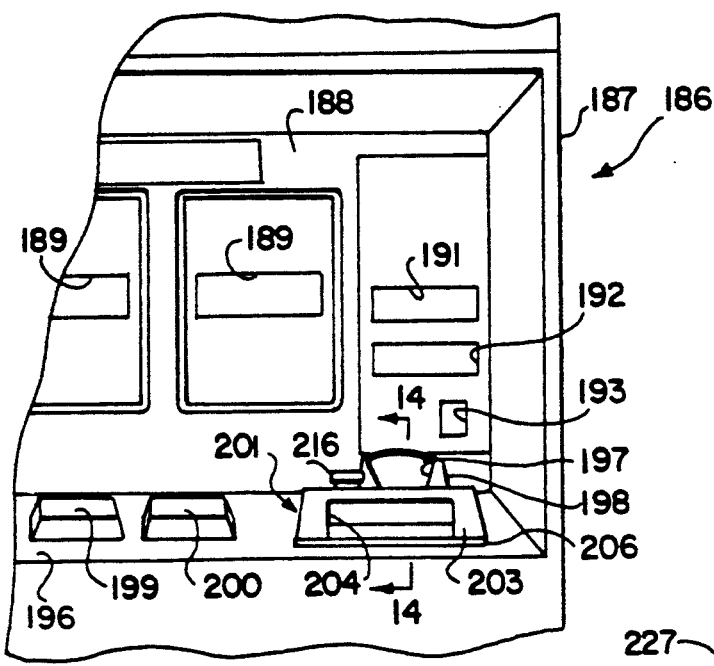
FIG. 13 is a partial front elevational view of another embodiment of a gambling device incorporating the present invention for use in the system shown in FIG. 12 and which incorporates an interface device for interfacing with a touch-memory device.

A partial front-elevational view of a gaming device, as for example a coin slot machine is shown in FIG. 13. As shown, such a coin slot machine typically comprises a cabinet or case 187 having a front panel 188 which is provided with a plurality of aligned windows 189, typically three for viewing the pay line for the machine. Such machines typically also include a winner paid window 191, a credit window 192 and a coins played window 193. Such gaming devices 186 are typically also provided with a downwardly sloping player panel 196 which carries a coin acceptor 197 that is provided with a slot 198. MIN button 199 and a MAX button 200 are provided on the sloping panel 196. They are disposed immediately to the left of the coin acceptor 197 as can be seen from FIG. 13.

A touch interface device 201 is provided. It consists of a metal housing 202 formed of a suitable material such as a metal casting is mounted immediately in front of the coin acceptor 197 and is provided with a front bezel 203 having a window 204 therein to permit viewing of a digital display device 205 mounted within the housing 202. The digital display device displays the current account balance of the casino patron. The housing 202 is secured to the coin acceptor 197 and to the downwardly sloping panel 196 by suitable means such as screws 206 extending into bosses 208. MIN and MAX buttons 211 and 212 are also provided on the downwardly sloping front panel 196 immediately to the left of the coin acceptor 197 as shown in FIG. 13 and form part of the conventional gaming device. A socket 216 which is adapted to receive and interface with a touch memory device 217 is mounted on the housing 202.

Figure 16:
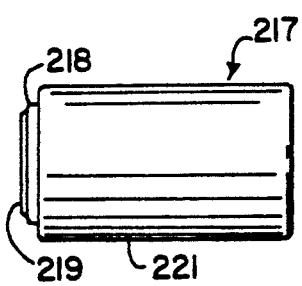
FIG. 16 is an isometric view of a touch-memory device utilized in the system and apparatus of the present invention.

The touch-memory device 217 can be of a suitable type such as the DS 1991 Multikey manufactured and sold by Dallas Semiconductor. The device is provided with a F5 stainless steel case 218 which is in the form of a flat pancake-like cylinder that is coin shaped to help ensure mating with the socket 216. The case 218 is provided with an insulated innerface 219 secured to the flanged rim forming the case 218. The case 218 has an outer diameter of approximately 18 millimeters and is secured to a handle 221 which, as shown in FIG. 16 can be in the form of a metal or plastic cylinder which has a sufficient size and mass to facilitate grasping of it by the hand of a human. Thus, by way of example the handle 221 can have a diameter of $\frac{1}{4}$" and a length of $1\frac{1}{4}$". The case 218 can have a depth of approximately 6 millimeters. The DS 1991 Touch Multikey serves as a rugged data carrier and provides 1,152 bits of secure read/write non-volatile memory. A 64 bit password must be matched in a password field in order to obtain access to the secure memory. Data is transferred serially via the one wire protocol which requires only a single data lead and a ground return. The ground return is provided by the rim and the data lead is provided by the innerface 219. A 512 bit scratch pad serves to ensure integrity of data transfers to the secure memory. A 64 bit factory laser ROM provides a unique permanently assigned serial number identity to each DS 1991.

Figure 14:
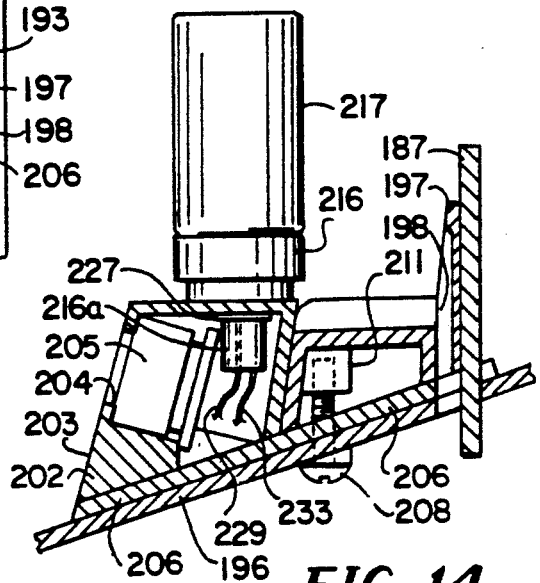
FIG. 14 is a cross-sectional view taken along line 14—14 in FIG. 13.

The socket 16 is formed of a suitable material such as chrome-plated steel and is provided with a cylindrical extension 216a which extends through a hole (not shown) in the housing 202 and is secured to the housing 202 by suitable means such as a C-ring 227. The socket 216 is provided with a cylindrical recess 228 which has been contoured to mate with the external surface of the case 213 and to provide a ground connection for the case. This ground connection is connected to a conductor 229 extending from the cylindrical extension 216a. The socket 216 is provided with a circular inner pad 231 which is mounted in the recess 228 but is insulated from the remainder of the socket 216 by suitable means such as an insulating layer 232. The conductive pad 231 is connected to another conductor 233 extending from the cylindrical extension 216a. As can be seen in FIGS. 13 and 14 the socket 216 is mounted on the housing 201 so it is offset to the left of the coin-slot 198 so as to not interfere with access to the coin slot 198. With the socket 216 lying generally in a horizontal plane with its recess 228 facing upwardly, the socket 216 is readily adapted to receive the touch-memory device 217 and will readily support the touch-memory device 217 so that the casino patron after placing the touch-memory device 217 in t he socket can leave it there until the casino patron has completed his play on the gaming device 186.

The housing 201 is secured to a metal plate 206 which is provided with various holes and apertures (not shown) and which is inclined at an angle so that it is adapted to overlie the downwardly inclined panel 196. The plate 206 is sized so that it can underlie the coin acceptor 197 as shown particularly in FIG. 14 permitting ready modification of existing gaming devices. This can be readily accomplished by removing screws 208 threaded into bosses 211, lifting up the metal coin acceptor 197, slipping the plate 206 under the same and then replacing the coin acceptor 197 over the top of the plate 206.. The screws 208 are replaced by threading the same into the bosses 211 to firmly secure the housing 201 thereto.

Figure 15:
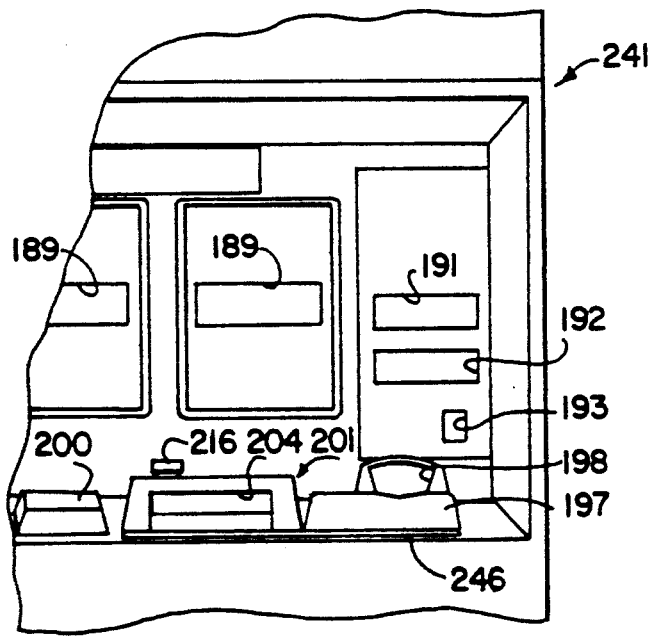
FIG. 15 is a front-elevational view showing another alternative embodiment of a gaming machine incorporating the present invention for use in the system shown in FIG. 12.

Another model of a gaming machine 241 is shown in FIG. 15. It is provided with a cabinet or case 242 which has a downwardly sloping front panel 246 which has a lesser depth than the panel 196 provided for the gaming device 186. For this reason the housing 202 of the present invention cannot be mounted in front of the coin acceptor 197 but is mounted to the left of the coin acceptor 197 as shown in FIG. 15. The housing 202 is secured to a metal plate 246 which is of greater length than the plate 206 and underlies both the coin acceptor 196 as well as the housing 202. The plate 246 is secured to the case 242 in the same manner as the coin acceptor 197 was secured in the gaming machine 186. The coin recess 198 is still accessible as well as are the MIN and MAX buttons 199 and 200. Thus, it can be seen that the present invention can be readily incorporated into various types of gaming devices. Installation of the apparatus of the present invention is made possible on conventional gaming machines without making any new holes in the cabinetry or case of the gaming machine.

By placing the touch-memory device interface 201 on the gaming machine 186 in the manner hereinbefore described, the casino patron can play the gaming machine by the use of coins or alternatively to use the touch-memory device 217 of the present invention to play the machine. The digital display provided in the window 204 makes it possible for the casino to place a welcoming message in the window. The window 204 can also be utilized to display to the casino patron the current balance left on his or her account after each transaction utilizing the touch-memory device 217.

The cashier terminal 181 as shown in FIG. 17 consists of a case 252 which is provided with the top surface 252 with a forwardly facing outwardly inclined bezel 253 and a downwardly sloping front panel 254. A touch-memory key pad 256 is provided on the right hand side of the front panel 254. A socket 216 of the type hereinbefore described is mounted in the front panel to the left of the key pad 256 as viewed in FIG. 17. A window 258 is provided in the front bezel 253 and serves to provide transaction information to the operator from a digital display (not shown) provided behind the window. A key slot 259 is provided in the top surface 252 and is adapted to receive an employee key of the type hereinbefore described in order to gain access to the system 151 shown in FIG. 12.

In FIG. 18 there is shown the circuitry which is provided within the gaming machine 186 which interfaces with the touch memory interface 201 of the present invention. The interface 201 is comprised of the display 205 and the touch-memory socket 216 which is connected to a microprocessor 261. The microprocessor 216 is connected to coin-accept circuitry 262. The MIN/MAX button interface circuitry 263 and the machine monitoring circuitry 264.

In FIGS. 19a and 19b, there is shown the circuitry which permits the MIN/MAX buttons 199 and 200 to be utilized in connection with the touch memory device 217 to permit this activity to be monitored by the microprocessor 261 provided in the gaming machine 186. As shown this circuitry consists of the existing MIN button and MAX buttons 199 and 200 that can be bypassed by relays 266 and 267 under the control of the microprocessor 261. Resistors R1 and R2 provide means for the microprocessor 261 to monitor casino patron activation of MIN bet and MAX bet buttons while in the bypass mode.

When a touch memory device 217 is not in the socket 216, the relays 266 and 267 will be in the normally closed deenergized portions to permit the normal operation of the gaming machine 167. When touch memory device 217 is in a socket 216, the relays 266 and 267 will be energized to move the relays to the normally open position. This disables the MAX and MIN bet buttons from directly controlling the gaming machine operation but permits the microprocessor 261 to utilize the account assigned to that serial number of touch memory device 217 for debiting that account every time a MIN button 199 or a MAX button 200 is pressed. To open the switch associated therewith to permit the voltage to be pulled up to the 5 VDC on the resistors R1 and R2 to supply a signal to the microprocessor 261 which effects operation of the coin accept circuitry 262 through conductors 268 and 269.

In FIG. 20 there is shown circuitry which is utilized in conventional gaming machines to permit the touch-interface device 201 of the present invention to operate in conjunction with those gaming machines even though those gaming machines may have various voltages some of which may be unknown and converting them into a voltage which can be utilized as a control signal by the microprocessor 261 of the present invention.

The incoming voltage from the conventional gaming machine identified in the circuitry as $V_{IN}$ or terminals 279 which can be either an AC or a DC voltage supplied to a diode 28 which serves as a half-wave rectifier and converts the incoming voltage whether it be AC or DC to a DC voltage which is supplied through a current limiting resistor RI. The resistor R1 in conjunction with the capacitor C1 forms a low-pass filter to filter out noise and voltage spikes from the incoming voltage. This filtered voltage is supplied to a $V_{IN}$ of regulator 282 of a conventional type such as an LM39LO5 supplied by National Semiconductor which produces a five volt output voltage at $V_{out}$ regardless of the input voltage up to approximately 50 volts. This 5 volt output is again filtered by the capacitor C2 to remove any ripple. The five volt output voltage then passes through a current limiting resistor R2 to a photo diode 283 provided in a commercially available opto-isolator 284 identified as part number 4N28 supplied by Motorola. The photo diode 283 turns on a photo transistor 286 in the opto-isolator which in turn pulls down the voltage on the output terminal 287 to zero when there is a voltage on the input terminals 279. If there is no input signal on the terminals 279, the resistor R3 connected to the output 287 will pull the output 287 up to a plus 5 volts from the seaparate 5 VDC supply shown in FIG. 20 to provide the standard desired voltage level desired-by the microprocessor 261.

From the foregoing it can be seen from the circuitry shown in FIG. 20 that it is possible to supply an unknown voltage AC or DC up to approximately 50 volts to the regulator 282 and still provide a constant voltage to the output 287 regardless of the voltage input. For that reason the value of the resistance R2 is selected to give optimal performance for the opto-isolator 284. The filtering provided by the capacitor C1 and C2 ensures that only a single pulse is provided rather than multiple pulses when an event occurs.

Operation and use of the system 151 shown in FIG. 12 may now be briefly described as follows. Let is be assumed that a group of tours is to arrive at a casino under the auspices of the marketing department of that casino. The manager of that department accesses the system 151 through the manager terminal 172 who would authorize a specific number of touch-memory devices to be programmed. The dollar value to be associated with each of the touch-memory devices 217 and the date and time they are to become valid and invalid. This information is supplied to the main server 152 as an action item for a cashier to perform. The cashier is presented with lists of casino patrons on the promotional tours. The cashier utilizing one of the cashier terminals 181 takes the employee key 111 issued to that cashier and inserts it into a slot 259 of the cashier terminal 181. The cashier then takes the touch-memory devices 217 one by one and inserts them into the socket 216 of the cashier terminal 181. The cashier initializes the touch-memory devices 277 and assigns the serial number of each touch-memory device to a casino patron on the tour list with the appropriate dollar value with the dates and times of validity and invalidity.

Upon the arrival of the tours at the casinos, the casino patrons would be called by name and be given their assigned touch-memory devices 217. The casino patrons can then take the touch-memory devices 217 immediately onto the casino floor and utilize the same to operate the gaming devices which have been equipped with the touch-interface devices 201 as hereinbefore described. To play one of the gaming machines so equipped, it is merely necessary for the casino patron to utilize the touch-memory device 217 supplied to him and to place it in a socket 216 of a gaming machine. The casino patron can then operate the gaming machine by pulling the handle of the gaming machine or alternatively by pressing MIN and MAX buttons 199 and 200 as desired by the casino patron.

During the time that the touch-memory devices 217 are being utilized by the casino patrons, the system 151 shown in FIG. 12 will track the expenditures of those promotional funds associated with the touch-memory devices 217 to track the machines on which they are used and also to track the denominational values selected by the casino patrons utilizing the machines. While on the tour, it is possible for the casino patrons to increase the monetary or dollar value accessible to the memory devices assigned to them by merely taking the same to a cashier station where the cashier would take the touch-memory device 217 and place it in a socket 216 of the cashier terminal 181 and add the additional value to the casino patron's corresponding to the money provided by the casino patron. At the same time the casino patron would be given a printed receipt from the printer 182.

The money which is expended by the use of each touch-memory device 217 is recorded in the slot machines 167 and is supplied to the slot bank server 161 associated therewith and then to the main server 152 making it possible for the manager to track the performance of the marketing efforts of the casino. By issuing the promotional funds associated with the touch-memory devices 217, the casino can guarantee that the promotional money is not spent in other casinos. By placing an authorized time frame in the touch-memory devices, the casino can guarantee that the promotional funds will be spent within that time frame for the tour and if not spent, the casino can recover any unused balances of the promotional money and return it to the promotional budget for the casino.

When the tours are being sponsored by a tour operator, the casino can monitor the performance of the casino patrons brought to the casino by that tour operator. It is also possible for the casino to track whether or not the casino patrons on the tour have gambled more money than they were given to begin with by the casino.

Typically, it is only when a casino patron comes up to the cashier cage and requests additional money to be placed in his or her account associated with his or her touch-memory device that the system will be triggered to request that the casino patron fill out a form giving customer or patron identification information to be associated with the touch-memory device issued to that casino patron. This facilitates the giving out of promotional funds. Thus personal information on the patron is only ascertained if funds are expended that are greater than those which have been given to the casino patron in connection with the promotion. This minimizes the amount of time required to get the casino patrons onto the floor after they have arrived on the tour. Once a casino patron has supplied the necessary customer information, a preprinted informational card is slid into a slot (not shown) provided on the receipt printer 182 which prints a serial number on a piece of paper which will associate it with the particular touch-memory device 217 being utilized. Thereafter, this information can be processed at a later time and entered into the system with full confidence that the correct touch-memory device is associated with that specific person.

In the event that a casino patron misplaces a touch-memory device or believes that it is stolen, the casino patron can immediately go up to cashier's station 177 and report the missing touch memory device 217. The cashier will then place this serial number of the touch-memory device in a special "hot" category to notify Security in the casino that whenever that touch-memory device is utilized in the casino it is being used improperly. The cashier, at the same time, can issue a new touch-memory device to the casino patron by deleting the assignment of the earlier serial number to that patron and assigning a new serial number to that casino patron so that the casino patron can continue playing with a minimum of interruption in time.

In connection with the present system, it is desirable that a separate key 111 such as that as hereinbefore described be utilized to provide employee access rather than a touch-memory device 217 of the type provided to the casino patron. This is because an employee is accessing the system 151 normally takes a certain amount of time to perform the desired functions which means that the cashier terminal 181 must be connected into the system 151 in real time. Thus an employee key 111 is inserted into a key slot 259 and left there until the transaction to be entered has been completed by the employee.

On the other hand, with the touch-memory device 217 the amount of information which must be conveyed to the slot machine and to the slot bank server is kept to a minimum thereby increasing the speed of the transaction so that play can commence almost immediately. Play can continue as long as the touch-memory device 217 is maintained in the socket 216. This also reduces the time required between plays and makes it possible to substantially increase the rate of play on a gaming machine.

Each touch-memory device 217 is provided with a security byte making it tamper proof to a high degree. The touch-memory devices 217 lend themselves to such high security because of the permanent electronically readable serial number.

In addition to the permanent serial number placed on each touch-memory device 217, an area of electronically alterable memory is provided in which the casino can place security information such as a security byte which in effect locks the system and prevents tampering with the touch-memory device 217. In accordance with the present invention, the security byte is altered after every transaction which takes place with respect to a touch-memory device 217. This security byte information is stored in the database. Therefore the next time the touch-memory device is presented to the system 151, the system 151 checks whether or not the security byte stored in the touch-memory corresponds with the one which is in the database. If they do not correspond a security alert will take place in the system and someone will be sent to investigate the casino patron and the touch-memory device being utilized. Thus, by way of example, if someone were able to get access to a casino patron's touch-memory device and make an exact electronic copy of it, the first use of the copy in the system would write a new security byte into the touch-memory device as the transaction is being processed. However, when the same electronic copy is utilized to access the system, the security byte will be one level down from that stored in the system and will not match the current level and thus will alert the system that a violation of the system is occurring and will deactivate or turn off that serial number for that touch-memory device to prevent any further access to the account for that touch-memory device.

To provide additional security to the casino, the software which is utilized in the system also can be encrypted to thereby prevent unauthorized acquisition of the custom software.

From the foregoing system, apparatus and method hereinbefore described it can be seen that the casino in issuing promotional funds can readily track the expenditure of those promotional funds and at the same time ensure that the promotional funds are expended in the casino for gambling on the gaming machines of the casino. This assures that the casino's promotional funds will be utilized in the casino itself and not at other casinos and also that such promotional funds will be utilized for gambling on the gaming machines and not for other purposes. The system makes it easy for the casino to develop different types of promotional programs to suit the purposes of the casino.

It should be appreciated that the system apparatus and method of the present invention may also be utilized in other applications, as for example for providing cashless gaming at gambling casinos. Also, it can be utilized in connection with play at amusement arcades such as those having video games and the like.

What is claimed is:

1. A system for tracking casino promotional funds given to a casino patron, comprising a plurality of gaming machines, a bank controller for the plurality of gaming machines, a server connected to said bank controller, a plurality of memory devices, each memory device having a memory therein which has encoded therein an identification of the memory device which is assigned to a casino patron, means for recording an account balance for the casino patron and associated with the memory device supplied to the casino patron and an interface device for each gaming machine adapted to interface with said memory device to permit operation of the gaming machine and to permit debiting of the account balance of the casino patron as the gaming machine is operated by the casino patron utilizing the assigned memory device.

2. A system as in claim 1 wherein said gaming machines are slot machines which include a mechanically activated device and wherein said interface device includes an electrically activated device connected in parallel with the mechanically activated device so that the slot machine is led to believe that when the electrically activated device is actuated a coin has been introduced into the slot machine.

3. A system as in claim 2 wherein said electrically activated device is a relay.

4. A system as in claim 1 wherein said server is provided with means for tabulating the use of the memory devices in the gaming machines.

5. A system as in claim 1 wherein said interface device includes means for receiving information from the memory devices.

6. A system as in claim 1 wherein said interface device includes a microprocessor, a display connected to the microprocessor, a memory device interface connected to the microprocessor, a gaming machine interface connected to the microprocessor and means connecting the microprocessor to the bank controller.

7. A system as in claim 1 wherein said memory device is in the form of a key.

8. A system as in claim 1 wherein said memory device is in the form of a touch-memory device.

9. A system as in claim 8 wherein said touch-memory device is in the form of a flat pancake-like cylinder and wherein said interface device includes a socket having a recess therein adapted to receive said cylinder and to make electrical contact therewith for transferring data into and out of the touch-memory device.

10. A system as in claim 9 wherein said interface device includes a housing for mounting said socket.

11. A system as in claim 10 wherein the gaming machine is in the form of a slot machine having a coin acceptor mounted thereon having a coin-receiving slot together with means for securing said housing to said slot machine including a plate underlying said coin acceptor and being secured to said coin acceptor and said slot machine.

12. A system as in claim 10 wherein said interface includes a housing having a window therein and a display device exposed through said window and providing information related to the operation of the touch-memory device.

13. A system as in claim 9 wherein said gaming machine is provided with MIN and MAX buttons together with electronic circuitry interconnecting said MIN and MAX buttons to said socket permitting bets to be made by operation of the MIN and MAX buttons in conjunction with the account information accessible by use of the touch-memory device.

14. A system as in claim 8 together with a cashier terminal having a socket for a touch-memory device mounted thereon and a slot for receiving an employee key, keyboard means and display means on the display terminal whereby upon operation of the keyboard means an increased account balance can be provided to the casino patron by placing the casino patron's memory key in the said socket.

15. A system as in claim 1 wherein each gaming machine is provided with a microprocessor together with electrical circuitry mounted in the gaming machine permitting gaming machine voltages, ranging up to 50 volts AC or DC to be utilized for controlling the microprocessor.

16. A method for tracking casino promotional funds given to a casino patron to require that such promotional funds given to a casino patron be utilized on gaming machines of the casino by providing a central data storage, a memory device having a permanently assigned serial number encoded therein and by providing an interface device associated with each gambling machine in the casino adapted to receive the memory device, comprising the steps of opening an account having an account identification at the central data storage for the casino patron assigning a serial number of a memory device to the account of the casino patron, crediting a currency value representing a promotional fund of the casino to the account of the casino patron, placing the memory device into the interface device, identifying the serial number of the memory device transmitting the serial number of the memory device to the central data storage and debiting the account of the casino patron at the central data storage as the gaming machine is utilized by the casino patron.

17. A method as in claim 16 together with the step of recording the account balance information of the casino patron in real time at a central data storage which is remote from the memory device.

18. A method as in claim 16 together with the step of providing a security byte in the memory device assigned to the casino patron and also into the account of the casino patron for detecting the use of a counterfeit memory device.

19. A method as in claim 18 wherein the security byte is changed after each use of the memory device.

20. A method as in claim 19 together with the step of instituting an alert when the device.

21. In a key programmer for use with a master key, a microprocessor, a master key socket connected to the microprocessor, a display connected to the microprocessor, and a plurality of slave key sockets connected to the microprocessor and programming means for causing the microprocessor to encode the keys placed in the slave sockets with the information carried by the master key placed in the master socket.

22. In a cashier terminal, a key slot for receiving an employee key, an interface socket for receiving a touch memory device, a keyboard and circuitry connecting the keyboard to the interface device and to the key slot whereby increased values can be placed in the account of the casino patron with the casino patron's memory device disposed in the interface device.

* * * * *